(12) United States Patent
Lim et al.

(10) Patent No.: US 7,691,959 B1
(45) Date of Patent: Apr. 6, 2010

(54) MOISTURE CURABLE SILICONE HOT MELT

(75) Inventors: Thomas Fay-Oy Lim, Shanghai (CN); David Dworak, East Hartford, CT (US); Jessica Fedorchick, Bristol, CT (US); Hsien-Kun Chu, Wethersfield, CT (US)

(73) Assignee: Henkel Corporation, Rocky Hill, CT (US)

( * ) Notice: Subject to any disclaimer, the term of this patent is extended or adjusted under 35 U.S.C. 154(b) by 324 days.

(21) Appl. No.: 11/926,883

(22) Filed: Oct. 29, 2007

Related U.S. Application Data

(60) Provisional application No. 60/856,668, filed on Nov. 3, 2006.

(51) Int. Cl.
*C08G 77/04* (2006.01)

(52) U.S. Cl. .......................... 528/28; 528/367; 528/369; 528/373; 528/381

(58) Field of Classification Search ................... 528/28
See application file for complete search history.

(56) References Cited

U.S. PATENT DOCUMENTS 6,750,309 B1 * 6/2004 Chu et al. ..................... 528/28

* cited by examiner

*Primary Examiner*—Randy Gulakowski
*Assistant Examiner*—Lindsay Nelson
(74) *Attorney, Agent, or Firm*—Steven C. Bauman

(57) ABSTRACT

The present invention generally relates to a moisture curable composition in the form of a hot melt. The inventive compositions contain hydrolyzable silyl groups connected to a polymer which is capable of crosslinking when exposed to moisture.

16 Claims, 2 Drawing Sheets

MOISTURE CURABLE SILICONE HOT MELT

BACKGROUND OF THE INVENTION

1. Field of the Invention

The present invention relates to a thermoplastic silicone hot melt that is moisture curable.

2. Brief Description of Related Technology

Thermoplastic polymers are a well-known and widely used class of polymers. Thermoplastic polymers allow for trial and error in attempts to form them into desired shapes. If the thermoplastic polymer is incorrectly molded, it can be reheated and set again. However, thermoplastic polymers have the disadvantage that a thermoplastic polymer set in an intended form may lose its shape when subjected to temperatures sufficient to cause softening or flow. This can be disadvantageous when the thermoplastic polymer has been set in a desired shape.

Among known thermoplastic polymers are hot melt adhesives. These polymers remain solid until they are heated to the appropriate temperature to make them flow. Hot melts typically form adhesive bonds with the substrate to which they are applied once the flowable polymer is cooled again to a solid.

In contrast to thermoplastic polymers, thermoset polymers avoid certain shown comings known to be associated with thermoplastic polymers in that once they are crosslinked, they retain their shape. Unfortunately, this ability that allows the thermoset polymer to maintain its shape can also be a disadvantage—once the thermoset polymer is set in a desired form, it cannot be changed, even if that particular form is not the intended or desired form. Thus, the thermoset polymer must be set in its correct form the first time it is set.

It would be desirable to provide a moisture curable hot melt which has the advantages of both thermoplastic and thermoset polymers, while avoiding the disadvantages associated with subjecting the thermoplastic polymer to high temperatures and the disadvantages associated with crosslinking the thermoset polymers.

SUMMARY OF THE INVENTION

The present invention relates to moisture curable hot melt compositions. While in the container, the composition remains a thermoplastic solid. The composition remains solid at room temperature but readily flows as a thermoplastic material at temperatures above 100° C. Once the composition is disposed to its intended final application, it is permitted to crosslink by exposure to moisture.

In one aspect of the present invention, there is provided a composition which includes a polymer of structural formula (IV):

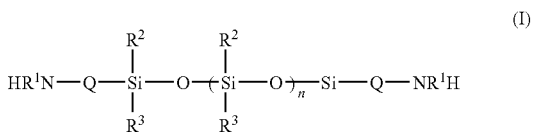

$Z_1$ in each occurrence may be the same or different and is:

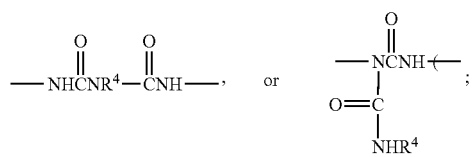

$Z_2$ in each occurrence may be the same or different and is:

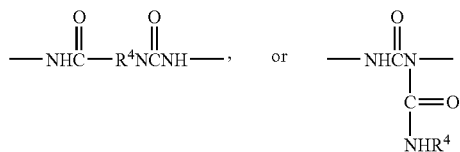

$R^1$, $R^2$, $R^3$, and $R^5$ in each occurrence may be the same or different and are independently selected from a hydrogen or a $C_{1-12}$ hydrocarbon radical; desirably $R^1$, $R^2$, $R^3$, and $R^5$ are independently a $C_{1-10}$ hydrocarbon radical; more desirably $R^1$, $R^2$, $R^3$, and $R^5$ are independently a $C_{1-5}$ hydrocarbon radical;

$R^4$ in each occurrence may be the same or different and is a hydrogen, a $C_{1-12}$ hydrocarbon radical or:

—Y—SiR$^5_a$(OR$^6$)$_{3-a}$ desirably $R^4$ is a $C_{1-10}$ hydrocarbon radical; more desirably $R^4$ is a $C_{1-5}$ hydrocarbon radical;

$R^6$ in each occurrence may be the same or different and is a $C_{1-12}$ hydrocarbon radical or an isocyanato group; desirably $R^6$ is a $C_{1-10}$ hydrocarbon radical; more desirably $R^6$ is a $C_{1-5}$ hydrocarbon radical;

Q, X and Y in each occurrence may be the same or different and are a $C_{1-20}$ hydrocarbon diradical; desirably Q, X and Y are a $C_{1-10}$ hydrocarbon diradical; more desirably Q, X and Y are a $C_{1-5}$ hydrocarbon diradical;

m is an integer from 1 to about 10 and desirably from 1 to about 5;

n is an integer 1 to about 400 and desirably from 1 to about 100; and a in each occurrence is an integer and may be the same or different and is 0 or 1.

In another aspect of the present invention there is provided a composition which includes the reaction product of:

(a) a composition having the structural formula (I):

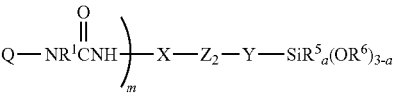

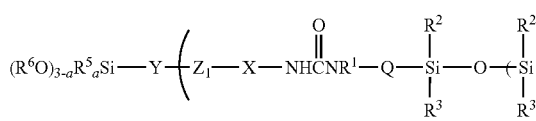

$R^1$, $R^2$, and $R^3$ in each occurrence may be the same or different and are independently selected from a hydrogen or a $C_{1-12}$ hydrocarbon radical;

Q in each occurrence may be the same or different and is a $C_{1-20}$ hydrocarbon diradical; and n is an integer 1 to about 400 and desirably from 1 to about 100.

(b) a diisocyanate compound having the structural formula (II):

OCN—X—NCO    (II)

X in each occurrence may be the same or different and is a $C_{1-20}$ hydrocarbon diradical; and (c) a compound having the structural formula (III):

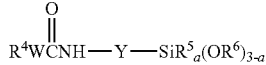

(III)

$R^4$ in each occurrence may be the same or different and is a hydrogen, a $C_{1-12}$ hydrocarbon radical or:

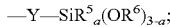

—Y—SiR$^5_a$(OR$^6$)$_{3-a}$;

$R^5$ in each occurrence may be the same or different and is a $C_{1-12}$ hydrocarbon radical; $R^6$ in each occurrence may be the same or different and is a $C_{1-12}$ hydrocarbon radical or an isocyanato group;

Y in each occurrence may be the same or different and is a $C_{1-20}$ hydrocarbon diradical; W is NH, O or S; and a in each occurrence may be the same or different and is 0 or 1.

The invention also provides a method for making a composition including (a) admixing a compound having the structural formula (I):

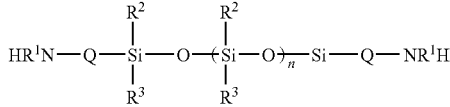

(I)

$R^1$, $R^2$ and $R^3$ in each occurrence may be the same or different and are independently selected from a hydrogen or a $C_{1-12}$ hydrocarbon radical; Q in each occurrence may be the same or different and is a $C_{1-20}$ hydrocarbon diradical; and n is an integer 1 to about 400 and desirably from 1 to about 100; with a diisocyanate compound having the structural formula (II):

OCN—X—NCO    (II)

X in each occurrence may be the same or different and is a $C_{1-20}$ hydrocarbon diradical; and a compound having the structural formula (III):

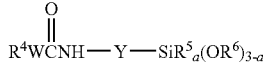

(III)

$R^4$ in each occurrence may be the same or different and is a hydrogen, a $C_{1-12}$ hydrocarbon radical or:

—Y—SiR$^5_a$(OR$^6$)$_{3-a}$;

$R^5$ in each occurrence may be the same or different and is a $C_{1-12}$ hydrocarbon radical; $R^6$ in each occurrence may be the same or different and is a $C_{1-12}$ hydrocarbon radical or an isocyanato group;

Y in each occurrence may be the same or different and is a $C_{1-20}$ hydrocarbon diradical; W is NH, O or S; Y is a $C_{1-20}$ hydrocarbon diradical; and a in each occurrence may be the same or different and is 0 or 1; and (b) heating the mixture reaction product and permitting the formation of a moisture curable hot melt reactive polymer.

DETAILED DESCRIPTION OF THE INVENTION

Figure 1:
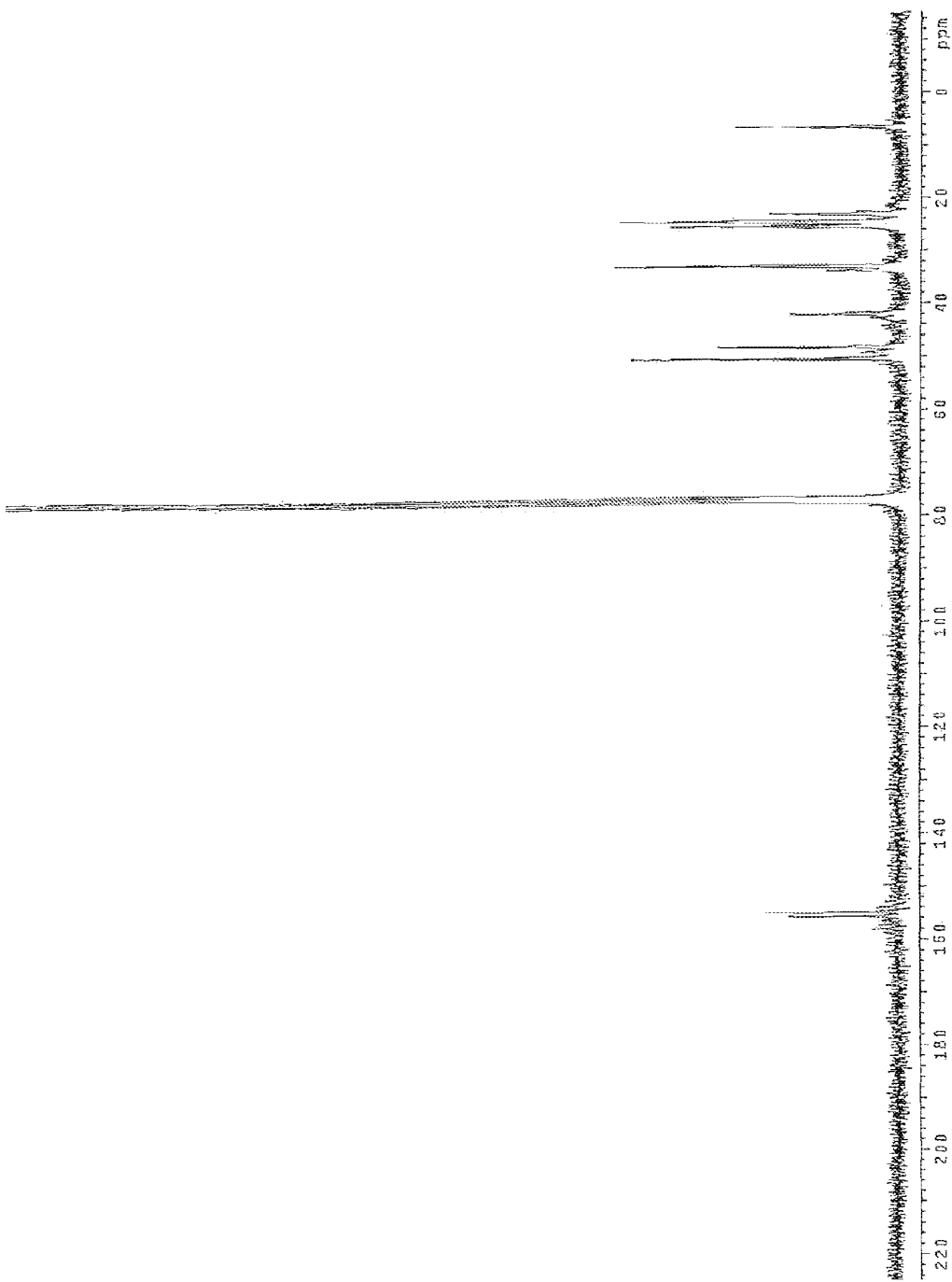
FIG. 1 shows the FT-IR spectroscopy results indicating the isocyanate group has substantially reacted.

The hot melt compositions of the present invention are made in general by reacting a polydimethyl siloxane terminated with alkyl groups with an isocyanate and a ureido- or carbamato-silane substituted with two or three alkoxy groups.

As used herein, the terms "hydrocarbon radical" and "hydrocarbon diradical" are intended to refer to radicals and diradicals, respectively, which are primarily composed of carbon and hydrogen atoms. Thus, the terms encompass aliphatic groups such as alkyl, alkenyl, and alkynyl groups; aromatic groups such as phenyl; and alicyclic groups such as cycloalkyl and cycloalkenyl.

Hydrocarbon radicals and diradicals of the invention may include heteroatoms to the extent that the heteroatoms do not detract from the hydrocarbon nature of the groups. Accordingly, hydrocarbon groups may contain heteroatoms such as halogens, oxygen, nitrogen, and sulfur. Thus, hydrocarbon groups may include such functional groups as ethers, alkoxides, carbonyls, esters, amino groups, amido groups, cyano groups, sulfides, sulfates, sulfoxides, and sulfones.

The term hydrocarbon includes heterocarbyl, heterocarbylene, hydrocarbyl and hydrocarbylene.

Reactant (I)

Non-limiting examples of useful aminohydrocarbyl-terminated polydimethyl siloxanes include those that correspond to the following structural formula (I):

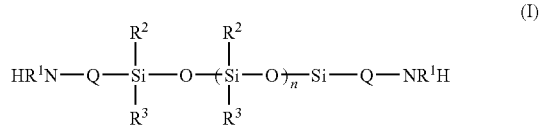

(I)

where $R^1$, $R^2$, and $R^3$ in each occurrence may be the same or different and are independently selected from a hydrogen or a $C_{1-12}$ hydrocarbon radical. Desirably, $R^1$, $R^2$, and $R^3$ are independently selected from an alkyl or an aryl group, for example $R^1$, $R^2$, and $R^3$ may be methyl, ethyl, propyl, butyl or phenyl. Q in each occurrence may be the same or different and is a $C_{1-20}$ hydrocarbon diradical. Q may be a hydrocarbylene or a heterocarbylene. Desirably, Q is an alkylene or an arylene linkage, such as methylene, ethylene, isobutylene and propylene. Generally n is an integer 1 to about 400 and desirably from 1 to about 100. Most preferably n is from 1 to about 50.

Reactant (II)

Non-limiting examples of useful isocyanates include those that correspond to the following structural formula (II):

OCN—X—NCO    (II)

where X in each occurrence may be the same or different and is a $C_{1-20}$ hydrocarbon diradical. X may be a hydrocarbylene or a heterocarbylene. Desirably, X is an alkylene or arylene linkage, such as methylene, ethylene, isobutylene, propylene, isophorone, phenylene, or cyclohexylene.

Examples of useful diisocyanates include, polyisocyanates such as monomeric 4,4'-methylene diphenyl diisocyanate, isophorone diisocyanate, phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates.

Reactant (III)

Non-limiting examples of useful ureido or carbamato silanes include those that correspond to the following structural formula (III):

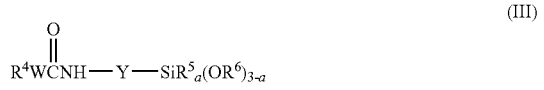

(III)

$R^4$ in each occurrence may be the same or different and is a hydrogen, a $C_{1-12}$ hydrocarbon radical or $-Y-SiR^5_a(OR^6)_{3-a}$. Desirably, $R^4$ is an alkyl or aryl group, for example $R^4$ may be methyl, butyl, propyl or phenyl. $R^5$ in each occurrence may be the same or different and is a $C_{1-12}$ hydrocarbon radical. Desirably, $R^5$ is an alkyl or aryl group, for example $R^5$ may be methyl, butyl, propyl or phenyl. $R^6$ in each occurrence may be the same or different and is a $C_{1-12}$ hydrocarbon radical or an isocyanato group. Desirably, $R^6$ is an alkyl or aryl group, such as methyl, butyl, propyl or phenyl. W is NH, O or S. Desirably, W is NH.

Y in each occurrence may be the same or different and is a $C_{1-20}$ hydrocarbon diradical. Y may be a hydrocarbylene or a heterocarbylene. Desirably, Y is an alkylene or arylene linkage, such as methylene, ethylene, isobutylene and propylene. Generally a in each occurrence may be the same or different and is 0 or 1.

Examples of useful ureido silanes include ureidopropyltrimethoxysilane, γ-ureidopropyltrimethoxysilane, and bis-1,3(trimethoxysilylpropyl)urea.

Examples of useful carbamato silanes include an alkylcarbamato alkylene trimethoxysilane, such as methyl carbomatopropyl trimethoxysilane.

Additional Components

Compositions of the current invention include polymers as described above and includes one or more of the compounds corresponding to structural formula IV.

Silanes are an example of additional components which may be incorporated in the compositions of the present invention. Silane components have the general structural formula (V):

$(R^7)Si(OR^8)_3$ (V)

where $R^7$ and $R^8$ can be identical or different monovalent hydrocarbon radicals having $C_{1-10}$; $R^7$ may also be a monovalent heterohydrocarbon radical having 1 to 10 carbon atoms wherein the hetero atoms are selected from halo atoms, O, N or S.

Desirably, $R^7$ and $R^8$ are selected from methyl, ethyl, isopropyl, vinyl, phenyl, methacryloxypropyl and norbornenyltrimethoxy; and $R^8$ is desirably selected from the group consisting of methyl, ethyl, isopropyl and $CH_2CH_2OCH_3$. Of particular usefulness in the present invention are vinyltrimethoxy silane and aminopropyltrimethoxy silane. Tertiary and secondary aminoalkoxysilanes are also useful.

Other useful silanes may include those with the general structural formula (VI):

$R^9-SiR^5_a(OR^{10})_{3-a}$ (VI)

where $R^5$ and a are as defined above; desirably $R^5$ is a hydrogen or an alkyl; $R^9$ may be a hydrocarbon radical or an isocyanato group; $R^{10}$ may be a hydrogen or a hydrocarbon radical; desirably $R^{10}$ is an alkyl group.

Other polyalkoxysilanes useful in the present invention include:

$Si(OCH_3)_4$, $Si(OCH_2CH_3)_4$, $Si(OCH_2CH_2CH_3)_4$, $(CH_3O)_3SiCH_3$, $(C_2H_5O)_3SiCH_3$, $(CH_3O)_3SiCH=CH_2$, $(C_2H_5O)_3SiCH=CH_2$, $(CH_3O)_3SiCH_2-CH=CH_2$, $(CH_3O)_3Si[CH_2-(CH_3)C=CH_2]$, $(C_2H_5O)_3Si(OCH_3)$, $Si(OCH_2-CH_2-OCH_3)_4$, $CH_3Si(OCH_2-CH_2-OCH_3)_3$,

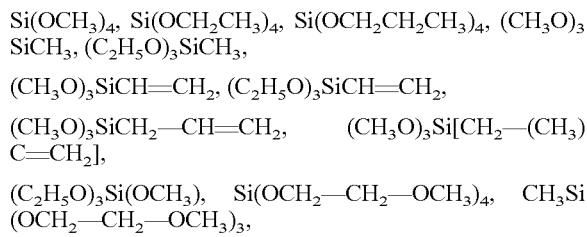

$CH_2=CHSi(OCH_2CH_2OCH_3)_3$, $C_6H_5Si(OCH_3)_3$, $C_6H_5Si(OCH_2-CH_2-OCH_3)_3$, $(CH_3O)_3Si[(CH_2)_3O-CH_2-CH\ CH_2]$, $(CH_3O)_3Si[(CH_2)_3-Cl]$, $(CH_3O)_3Si[(CH_2)_3OOC(CH_3)C=CH_2]$, $(C_2H_5O)_3Si(CH_2)_2CH_2-Cl$, $(CH_3O)_3Si(CH_2)_3NH_2$, $(C_2H_5O)_3Si(C_2)_3NH_2$, $(CH_3O)_3Si(CH_2)_3NH(CH_2)_2NH_2$, $(C_2H_5O)_3Si(CH_2)_3NH(CH_2)_2NH_2$, $(CH_3O)_3-Si(CH_2)_3SH$, $(CH_3O)_3Si[(CH_2)_3OOCH_2=CH]$, and

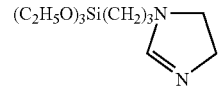

Desirably a premix of structural formulas III and V are used in the reaction, i.e. added to reactants I and II.

The inventive compositions may include a cure system. The inventive compositions may advantageously include one or more moisture-cure catalysts. The cure system used in the moisture curable compositions of the present invention includes, but is not limited to, catalysts or other reagents which act to accelerate or otherwise promote the curing of the composition of the invention. Suitable moisture-cure catalysts include compounds which contain such metals as titanium, tin, or zirconium. Illustrative examples of the titanium compounds include tetraisopropyl titanate and tetrabutyl titanate. Illustrative examples of the tin compounds include dibutyltin dilaurate, dibutyltin diacetate, dioctyltindicarboxylate, dimethyltindicarboxylate, and dibutyltindioctoate. Zirconium compounds include zirconium octanoate, and zinc compounds include 2-ethylhexanoate, the later which is favored for medical applications which require use of catalysts having minimal cytotoxicity. Additionally, organic amines such as tetramethylguandinamines, diazabicyclo [5.4.0]undec-7-ene (DBU), triethylamine, and the like may be used. The moisture-cure catalysts are employed in an amount sufficient to effectuate moisture-cure, which generally is from about 0.01% to about 5.00% by weight, and advantageously from about 0.1% to about 1.0% by weight.

The moisture curable component may also include a cross-linking agent. Cross-linking is the attachment of two or more chains of polymers by, for example, bridges and cross bridges, comprising either an element, a group, or a compound. Suitable agents may be selected from a variety of crosslinkers, such as, but not limited to: a monomeric, cyclic, oligomeric or polymeric silazanes, an amino-functional silazane, an enoxy-functional silazane, a silicon hydride, an alkoxy functional silane, a methylethylketoxime functional silane, an acetoxy functional silane, an enoxy functional silane, an amino-functional silane, and combinations thereof. More specifically, suitable crosslinkers include, but are not limited to: tris methylamino functional silane, tris enoxy functional silane, hydride functional silanes, and cyclic trisilazane. A particularly desirable cross-linker may include A-Link 35, isocyanatopropyl trimethoxysilane.

Cross-linking agents desirably are present in the hot melt compositions of the present invention in an amount from about 1% to about 20% w/w, more desirably from about 5% to about 8% w/w. Moreover, it is desirable that the siloxane carrier component, if present, does not react with the crosslinker component in the compositions of the present invention.

A variety of additional useful components may be added to the present inventive compositions, so long as they do not interfere with the moisture curing mechanism. For example, reactive and non-reactive diluents may be added. Such diluents include, without limitation, vinyl trimethoxysilane; alkyl acetates; hydrocarbon solvents, such as toluene; and acrylamides, such as N,N-dimethyl acrylamide. Other useful additives include plasticizers, fillers such as silica, viscosity modifiers, flow modifiers, pigments, antioxidants, stabilizers, inhibitors, adjuvants, catalysts, accelerators, thixotropic agents, and combinations thereof. These additives should be present in amounts suitable to effectuate their intended purpose.

Synthetic Schemes of the Inventive Reactive Polymers

As shown in the reaction schemes below, the same reactants may produce a different number of reactive polymers. It is also shown that different reactants may produce the same reactive polymer.

Scheme 1:

In the following scheme, a polydimethylsiloxane terminated aminocarbylene, a diisocyanate and aureido silane are combined to form the reactive polymer ($IV_a$). The reactive polymer contains $Z_{1a}$ which corresponds to

as defined above, as well as $Z_{2a}$ which corresponds to

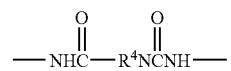

as defined above.

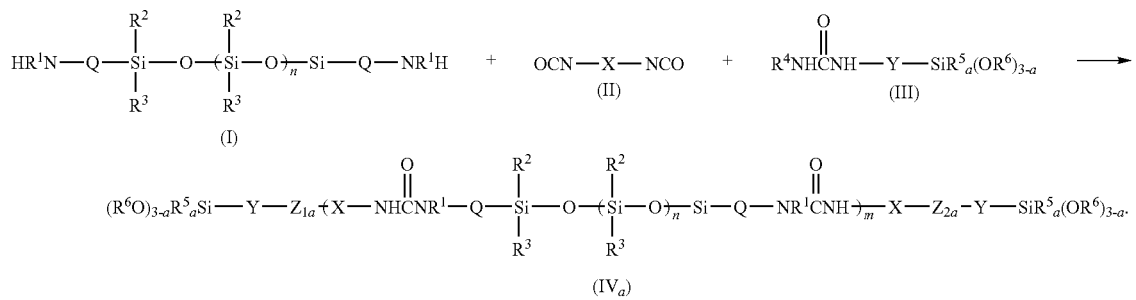

Scheme 2:

In the following scheme, a polydimethyl siloxane terminated aminocarbylene, a diisocyanate and ureido-silane are combined to form the reactive polymer ($IV_b$). The reactive polymer contains $Z_{1b}$ which corresponds to

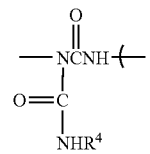

as defined above, as well as $Z_{2b}$ which corresponds to

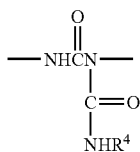

as defined above.

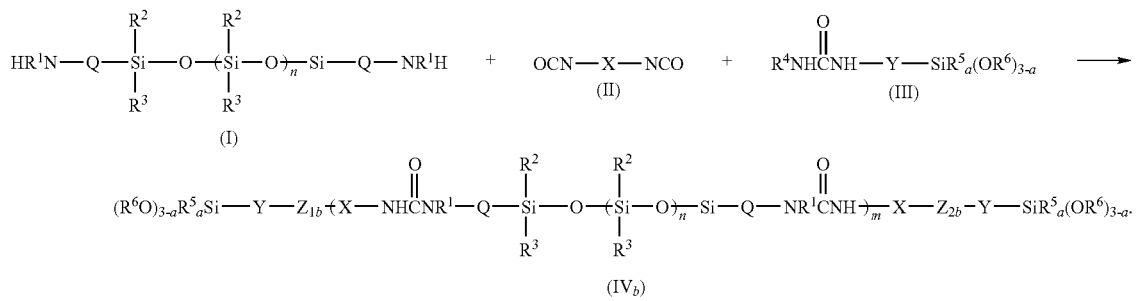

Scheme 3:

In the following scheme, a polydimethyl siloxane terminated aminocarbylene, a diisocyanate and ureido silane are combined to form the reactive polymer (IV$_c$). The reactive polymer contains $Z_{1a}$ which corresponds to

as defined above, as well as $Z_{2b}$ which corresponds to

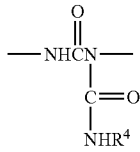

as defined above.

Scheme 4:

In the following scheme, a polydimethyl siloxane terminated aminocarbylene, a diisocyanate and carbamato-silane are combined to form the reactive polymer (IV$_d$). The reactive polymer contains $Z_{1b}$ which corresponds to

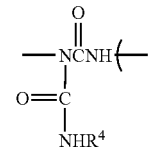

as defined above, as well as $Z_{2b}$ which corresponds to

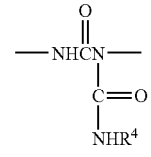

as defined above.

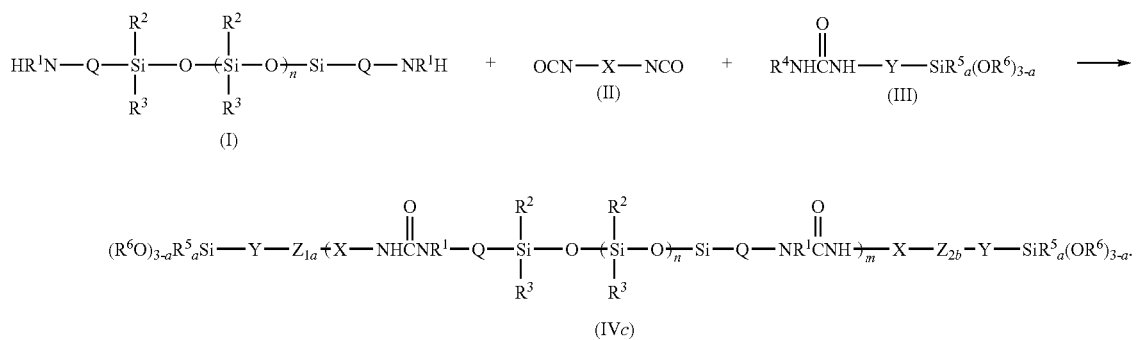

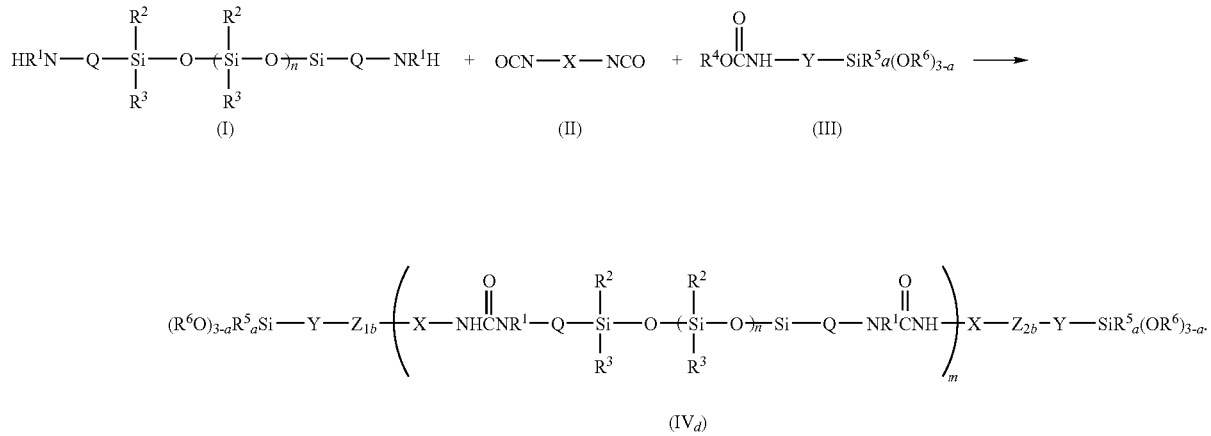

Scheme 5:
In the following scheme, a polydimethyl siloxane terminated aminocarbylene, a diisocyanate and thiourea are combined to form the reactive polymer ($IV_e$). The reactive polymer contains $Z_{1b}$ which corresponds to

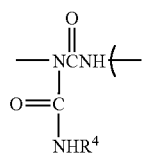

as defined above, as well as $Z_{2a}$ which corresponds to

as defined above.

Compositions of the Invention

Typical compositions of the present invention include reactive polymers corresponding to structural Formula (IV) as defined above, and a moisture cure catayslt.

Preparation of the Compositions of the Invention

Compositions of Formula (IV) may be prepared by mixing:
(a) a composition having the structural formula (I):

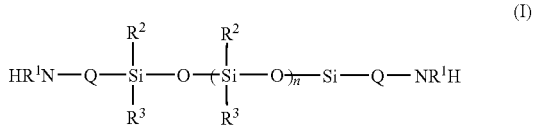

where Q, $R^1$, $R^2$, $R^3$, and n are as defined above.
(b) a diisocyanate compound having the structural formula (II):

where X is as defined above; and

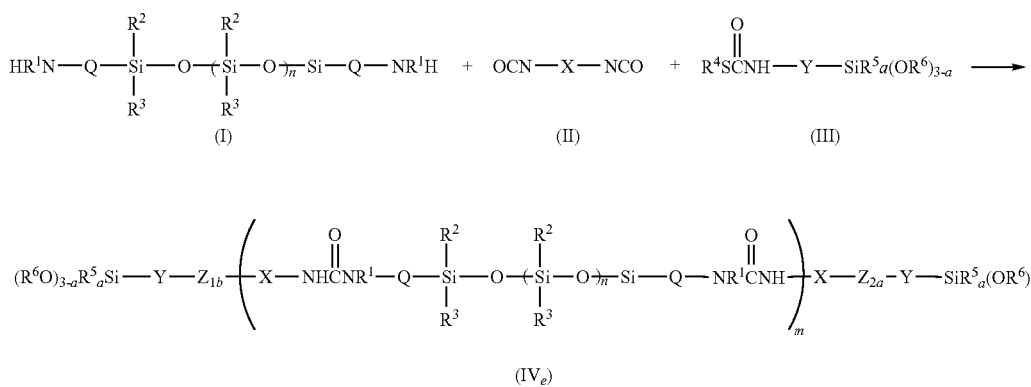

(c) a compound having the structural formula (III):

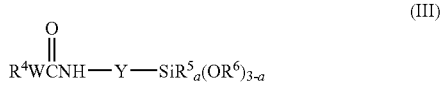
(III)

where $R^4$, $R^5$, $R^6$, W, Y and a are as defined above. Accordingly, the present invention relates to both this method and to compositions that are the reaction product of this method.

The following examples are intended to show various compositions made in accordance with the present invention.

EXAMPLES

Example 1

In a one liter reaction kettle fitted with an additional funnel, a thermometer and a mechanical stirrer were charged with 179.30 g of an aminopropyldimethylsilyl terminated PDMS (MW: 2,500; 0.1195 moles amine) and phenyltrimethoxysilane in an amount about 1% by weight of the composition. The mixture was heated and stirred at a temperature of 130° C. A solution containing 13.26 g of isophorone diisocyanate (0.1195 moles isocyanate) and 8.99 g of ureidopropyltrimethoxysilane (0.0384 moles) in 22 g of toluene was then placed in the additional funnel and slowly added to the heated mixture dropwise. The addition resulted in viscosity increase of the reaction mixture. The temperature of the reaction mixture was then raised to 150° C. during the latter part of the addition to ease the mixing. The final reaction product was a clear liquid at 150° C., which solidified upon cooling. The molecular weight of this copolymer was 50,500 as determined by GPC using polystyrene standard. A test sheet was cast with 0.1% of a dialkyl tin dicarboxylate catalyst added. The test sheet was cured for 7 days under a 55% humidity environment at room temperature. The clear cured sheet showed the following mechanical properties: tensile strength: 554.8 psi and % elongation at break: 245.4%.

Example 2

In a one liter reaction kettle fitted with an additional funnel, a thermometer and a mechanical stirrer were charged with a mixture containing 187.65 g of an aminopropyldimethylsilyl terminated PDMS (mw: 2,500; 0.1250 moles of amine) and 9.38 g of bis-1,3(trimethoxysilylpropyl)urea (0.0244 moles). The mixture was heated to 140° C. with vigorous stirring. A solution of 18.56 g isophorone diisocyanate (0.1672 moles isocyanate) in 20 g toluene was then slowly added dropwise. The reaction product was a hazy liquid at a temperature of 140° C., but solidified at room temperature.

A test sheet was cast with the addition of 0.1% of a dialkyl tin dicarboxylate catalyst and cured for 7 days at 55% humidity at room temperature. Mechanical properties were found to be: Tensile strength: 389.5 psi; % elongation at break: 174.2%.

Example 3

A mixture containing 2.12 g of γ-ureidopropyltrimethoxysilane and 1.25 g of cyclohexyl isocyanate was heated to and at a temperature of 90° C. for 5 hours and monitored by FT-IR. At the end of the 5 hours, FT-IR indicated only partial consumption of the isocyanate. The mixture was then further heated to and at a temperature of 110° C. for 1 hour. FT-IR spectroscopy indicated the isocyanate group is substantially reacted as evidence by the disappearance of the isocyanate absorptions at 2250 cm$^{-1}$ and the appearance of a new carbonyl absorption at 1680 cm$^{-1}$. $^{13}$C-NMR of this product also showed two carbonyl carbons near 154 and 156 ppm with no isocyanate carbon. The $^{13}$C-NMR is consistent with the structure of a biuret addition product. (See FIG. 1.)

Example 4

Figure 2:
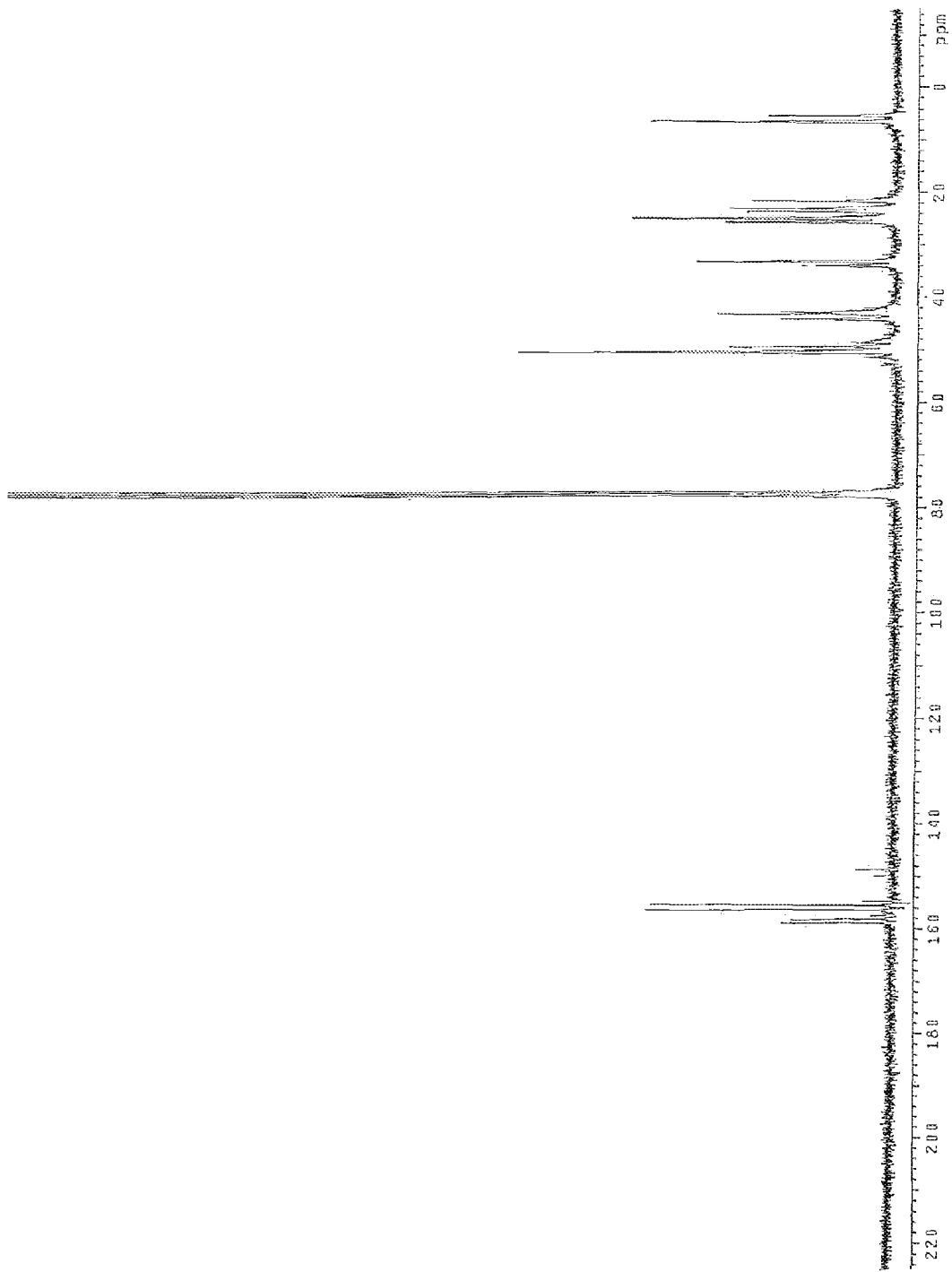
FIG. 2 shows the FT-IR spectroscopy results indicating a steady consumption of the isocyanate group.

A mixture containing 1.92 g of bis-1,3-(trimethoxysilylpropyl)urea and 0.62 g of cyclohexyl isocyanate was heated to and at a temperature of 110° C. and monitored by FT-IR. FT-IR indicated a steady consumption of isocyanate as evidenced by the steady decrease of the isocyanate absorption at 2250 cm$^{-1}$ and the steady appearance of a new carbonyl absorption at 1680 cm$^{-1}$. The mixture was heated to and at a temperature of 110° C. for a period of time of 24 hours. $^{13}$C-NMR of this reaction product indicated a total of four carbonyl carbons at 154-160 ppm with no isocyanate carbon in 110-140 ppm region. The NMR is consistent with a mixture containing both a single and a double biuret addition product. (See FIG. 2.)

What is claimed is:
1. A composition comprising the structure:

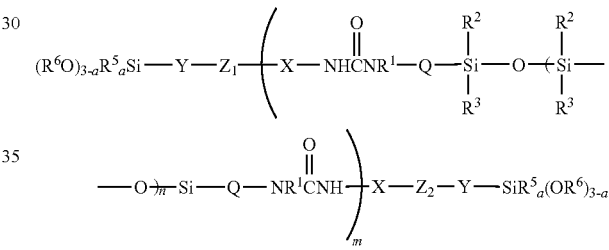

wherein $Z_1$ in each occurrence is the same or different and is selected from the group consisting of:

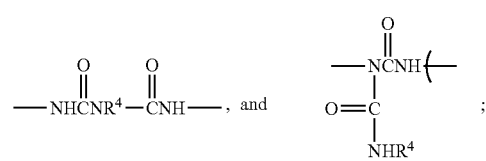

$Z_2$ in each occurrence is the same or different and is selected from the group consisting of:

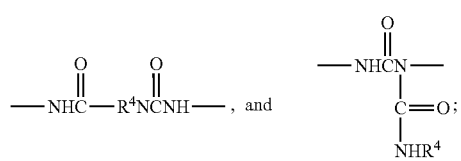

$R^1$, $R^2$, $R^3$, and $R^5$ are in each occurrence the same or different and independently selected from the group consisting of hydrogen and a $C_{1-12}$ hydrocarbon radical;

$R^4$ in each occurrence is the same or different and is independently selected from the group consisting of hydrogen, a $C_{1-12}$ hydrocarbon radical or —Y—SiR$^5_a$(OR$^6$)$_{3-a}$;

$R^6$ in each occurrence is the same or different and is independently selected from the group consisting of a $C_{1-12}$ hydrocarbon radical and an isocyanate;

Q, X, and Y in each occurrence are the same or different and are each independently a $C_{1-20}$ hydrocarbon diradical;

m is 1 to about 10;

n is 1 to about 400;

a in each occurrence is the same or different and is 0 or 1.

2. The composition of claim 1, wherein said $R^1$, $R^2$, $R^3$, $R^4$, $R^5$, and $R^6$ independently are an alkyl group.

3. The composition of claim 1, wherein said $R^1$, $R^2$, $R^3$, $R^4$, $R^5$, and $R^6$ independently are an aryl group.

4. The composition of claim 1, wherein said Q, X and Y independently are an alkylene linkage.

5. The composition of claim 1, wherein said Q, X and Y independently are an arylene linkage.

6. The composition of claim 1, further comprising a cure system.

7. The composition of claim 6, wherein said cure system comprises a moisture cure catalyst.

8. A composition comprising the reaction product of:

(a) a composition of structural formula (I):

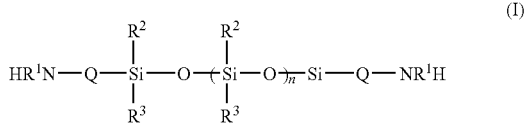
(I)

wherein $R^1$, $R^2$ and $R^3$ in each occurrence are the same or different and are independently selected from the group consisting of a hydrogen and a $C_{1-12}$ hydrocarbon radical;

Q in each occurrence is the same or different and is a $C_{1-20}$ hydrocarbon diradical;

n is 1 to about 400;

(b) a diisocyanate compound having the structural formula (II):

(II)

wherein X is a $C_{1-20}$ hydrocarbon diradical; and (c) a compound having the structural formula (III):

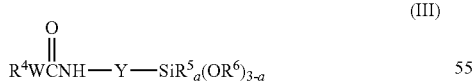
(III)

wherein $R^4$ is selected from the group consisting of hydrogen, a $C_{1-12}$ hydrocarbon radical and —Y—SiR$^5_a$(OR$^6$)$_{3-a}$;

$R^5$ is a $C_{1-12}$ hydrocarbon radical;

$R^6$ is selected from the group consisting of a $C_{1-12}$ hydrocarbon radical and an isocyanato group;

W is selected from the group consisting of NH, O and S;

Y is a $C_{1-20}$ hydrocarbon diradical;

a in each occurrence is the same or different and is 0 or 1.

9. The composition of claim 8, further comprising an additional silane having the structural formula

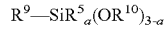
$R^9$—SiR$^5_a$(OR$^{10}$)$_{3-a}$ wherein $R^9$ is selected from the group consisting of a hydrocarbon group and an isocyanato group; $R^5$ is selected from the group consisting of hydrogen and an alkyl group and $R^{10}$ is an alkyl group.

10. The composition of claim 9, wherein $R^1$, $R^2$, $R^3$, $R^4$, $R^5$ and $R^6$ are each the same or different and are independently selected from the group consisting of an alkyl and aryl group; and Q and Y are each the same or different and are independently selected from selected from the group consisting of an alkylene and arylene linkage; and wherein said diisocyanate compound is a member selected from the group consisting of phenyl diisocyanate, toluene diisocyanate, 4,4'-diphenyl diisocyanate, 4,4'-diphenylene methane diisocyanate, dianisidine diisocyanate, 1,5-naphtalene diisocyanate, 4,4'-diphenyl ether diisocyanate, p-phenylene diisocyanate, 4,4'-dicyclohexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, 3,5-diethyl-4,4'-diisocyanatodiphenyl-methane, isophorone diisocyanate, hexamethylene diisocyanate, and 1,3-bis(cyanatomethyl)cyclohexane.

11. The composition of claim 8, further comprising a cure system.

12. The composition of claim 11, wherein said cure system comprises a moisture cure catalyst.

13. A method for making a composition comprising the steps of:

(a) admixing:

(i) a compound having the structural formula (I):

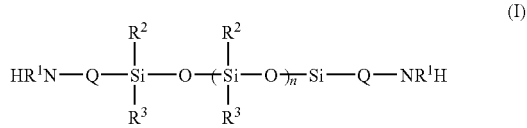
(I)

wherein $R^1$, $R^2$ and $R^3$ in each occurrence are the same or different and is independently selected from the group consisting of a hydrogen and a $C_{1-12}$ hydrocarbon radical;

Q in each occurrence is the same or different and is a $C_{1-20}$ hydrocarbon diradical;

n is 1 to about 400; with (ii) a diisocyanate compound having the structural formula (II)

(II)

wherein

X is a $C_{1-20}$ hydrocarbon diradical; and (iii) a compound having the structural formula (III)

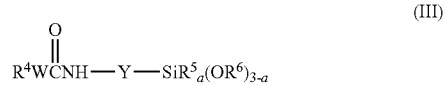
(III)

wherein $R^1$, $R^2$, $R^3$, $R^4$, $R^5$ and $R^6$ are each the same or different and are independently selected from the group consisting of an alkyl or aryl group;

Q and Y are each the same or different and are independently selected from the group consisting of an alkylene or arylene linkage; and a in each occurrence may be the same or different and is 0 or 1; and (b) heating mixture and permitting the formation of a moisture curable hot melt reactive polymer.

14. The method of claim 13, wherein $R^1$, $R^2$, $R^3$, $R^4$, $R^5$ and $R^6$ are each the same or different and are independently selected from the group consisting of an alkyl or aryl group; and Q and Y are each the same or different and are independently selected from the group consisting of an alkylene or arylene linkage; and said diisocyanate compound is a member selected from the group consisting of phenyl diisocyanate, toluene diisocyanate, 4,4'-diphenyl diisocyanate, 4,4'-diphenylene methane diisocyanate, dianisidine diisocyanate, 1,5-naphtalene diisocyanate, 4,4'-diphenyl ether diisocyanate, p-phenylene diisocyanate, 4,4'-dicyclo-hexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, 3,5-diethyl-4,4'-diisocyanato-diphenyl-methane, isophorone diisocyanate, hexamethylene diisocyanate, and 1,3-bis(cyanatomethyl)cyclohexane.

15. The method of claim 14, wherein said reaction product of (a) further comprises a cure system.

16. The method of claim 15, wherein said cure system comprises a moisture cure catalyst.

* * * * *